United States Patent
Wake et al.

(10) Patent No.: US 9,358,900 B2
(45) Date of Patent: Jun. 7, 2016

(54) STOP METHOD OF VEHICLE ELECTRICAL POWER SYSTEM

(71) Applicant: HONDA MOTOR CO., LTD., Tokyo (JP)

(72) Inventors: Chihiro Wake, Wako (JP); Takuya Shirasaka, Wako (JP); Go Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 249 days.

(21) Appl. No.: 14/093,832

(22) Filed: Dec. 2, 2013

(65) Prior Publication Data
US 2014/0156128 A1    Jun. 5, 2014

(30) Foreign Application Priority Data
Nov. 30, 2012    (JP) .................................. 2012-263272

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 11/18 | (2006.01) |

(Continued)

(52) U.S. Cl.
CPC ............. *B60L 11/1881* (2013.01); *B60L 1/003* (2013.01); *B60L 1/02* (2013.01); *B60L 11/1861* (2013.01); *B60L 11/1885* (2013.01); *B60L 11/1887* (2013.01); *B60L 11/1892* (2013.01); *B60L 2210/10* (2013.01); *B60L 2240/36* (2013.01); *H01M 8/02* (2013.01); *H01M 8/04* (2013.01); *Y02T 10/705* (2013.01); *Y02T 10/7044* (2013.01); *Y02T 10/7216* (2013.01); *Y02T 90/34* (2013.01)

(58) Field of Classification Search
CPC ........ B60L 11/1881; H01M 8/02; H01M 8/04
USPC .............................................. 701/22; 429/13
See application file for complete search history.

(56) References Cited

FOREIGN PATENT DOCUMENTS

| | | | |
|---|---|---|---|
| JP | 2003-115317 A | | 4/2003 |
| JP | 2007-165055 A | | 6/2007 |
| JP | 2007165055 A | * | 6/2007 |

OTHER PUBLICATIONS

English Translation of JP2007165055.*

*Primary Examiner* — Helal A Algahaim
*Assistant Examiner* — Mahmoud Ismail
(74) *Attorney, Agent, or Firm* — Squire Patton Boggs (US) LLP

(57) ABSTRACT

A fuel cell system executes charge processing to charge electric power generated by a stack to a battery, and sealed discharge processing to cause an oxygen concentration inside a cathode flow channel to decrease, after a stop operation has been made on a power switch. The stop method of a fuel cell system includes: a step of calculating a remaining charge time corresponding to a time in which charge processing can be executed, by subtracting a time required in sealed discharge processing from a predetermined stop processing permitted time, after a stop operation has been made on the power switch (Step S52), a step of calculating a remaining target charge amount of the battery (Step S54), a step of executing charge processing while controlling output of the stack based on the remaining charge time and remaining target charge amount (Step S56), and a step of executing sealed discharge processing.

16 Claims, 9 Drawing Sheets

(51) Int. Cl.
  *B60L 1/00* (2006.01)
  *B60L 1/02* (2006.01)
  *H01M 8/06* (2006.01)
  *H01M 8/02* (2016.01)
  *H01M 8/04* (2016.01)

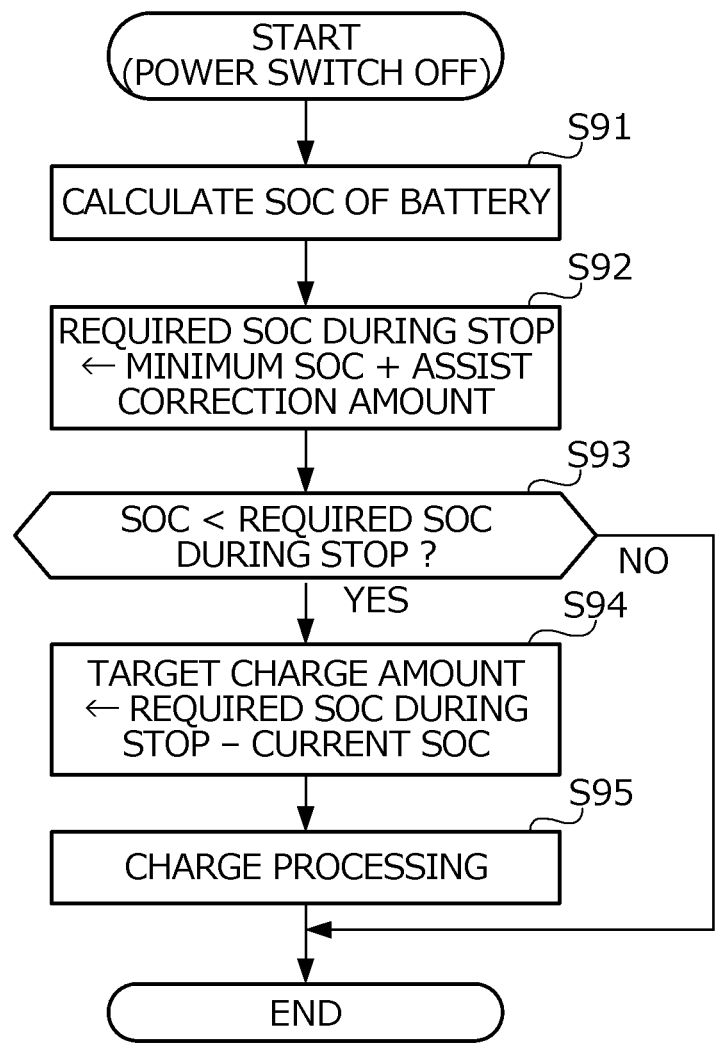

STOP METHOD OF VEHICLE ELECTRICAL POWER SYSTEM

This application is based on and claims the benefit of priority from Japanese Patent Application No. 2012-263272, filed on 30 Nov. 2012, the content of which is incorporated herein by reference.

BACKGROUND OF THE INVENTION

1. Field of the Invention

The present invention relates to a stop method of a vehicle electrical power system.

2. Related Art

Fuel cell vehicles equipped with a fuel cell system as the vehicle electrical power system supply air and hydrogen to the fuel cell, and drive a drive motor using the electric power thereby generated to travel. In the fuel cell system, a battery is provided as an energy source for driving various accessories required in order to start electric power generation by the fuel cell, and stores the electric power generated by the fuel cell.

Since the supply of electric power from the battery is necessary in startup of the fuel cell system in above way, for example, the remaining amount of the battery required in a subsequent startup is ensured by continuing electrical power generation by way of the fuel cell even after a stop operation of the fuel cell system so as to charge the battery.

Incidentally, after a stop operation of the fuel cell system, in addition to charge processing after the aforementioned such stop, processing to adjust the concentration of gases inside the flow channels of air and hydrogen (hereinafter referred to as "concentration adjustment processing") is performed. As a specific example of this concentration adjustment processing, for example, there is concentration reduction processing that causes the oxygen concentration inside of the cathode flow channel of the fuel cell to decrease to make inside of the cathode flow channel a low oxygen concentration state (nitrogen rich state) (refer to Patent Document 2). If oxygen remained inside of the cathode flow channel as is, there is concern over the cathode side of the fuel cell entering a high potential state when supplying hydrogen to the anode system during the next startup, and the solid polymer electrolyte membrane of the fuel cell degrading. The concentration reduction processing is preferably performed jointly with the above-mentioned charge processing after the stop operation of the fuel cell system in order to prevent such degradation of the fuel cell during the next startup.

[Patent Document 1] Japanese Unexamined Patent Application, Publication No. 2007-165055

[Patent Document 2] Japanese Unexamined Patent Application, Publication No. 2003-115317

SUMMARY OF THE INVENTION

However, the charge processing and concentration adjustment processing are both types of processing that are performed after the stop operation of a fuel cell vehicle by an operator; therefore, there is concern over giving an uncomfortable feeling to the user when these types of processing are performed over a long time. Additionally, since it is assumed that maintenance of the vehicle may be performed immediately after the stop operation of the fuel cell vehicle, it is preferable for the above-mentioned sequence of processing to complete within a prescribed time period so as not to prolong as much as possible.

Although the electrical power system of a fuel cell vehicle has been explained as an example above, there are the same problems in electrical power systems for so-called hybrid vehicles equipped with an internal combustion engine, motor generator and battery. Among such hybrid vehicles, there are those that perform charging of the battery by continuously driving the motor generator by way of the internal combustion engine even after a stop operation. Therefore, since it is assumed that maintenance of the vehicle may be performed immediately after the stop operation of the hybrid vehicle, it is preferable for this charge processing to complete in as short a time as possible.

The present invention has an object of appropriately completing the processing performed after a stop operation, in the stop method of a vehicle electrical power system that performs at least charge processing after the stop operation by a driver, so as not to exceed a predetermined time or within as short a time as possible.

According to a first aspect of the present invention, a vehicle electrical power system includes: a fuel cell (e.g., the stack 2 described later) that generates electric power when fuel gas is supplied to an anode flow channel (e.g., the anode flow channel 21 described later) and oxidant gas is supplied to a cathode flow channel (e.g., the cathode flow channel 22 described later); an electrical storage device (e.g., the battery 6 described later) that stores electric power generated by the fuel cell; a stop switch (e.g., the power switch 9 described later) that generates a signal to cause electric power generation by way of the fuel cell to stop; and a load (e.g., the air compressor 41, drive motor 8, cooling device 5, etc. described later) that is driven by way of supply of electric power from the fuel cell or the electrical storage device, in which, after the stop switch has been operated, the system executes charge processing (e.g., the charge processing of Step S56 in FIG. 6 described later) to charge electric power generated by the fuel cell to the electrical storage device, and concentration adjustment processing (e.g., the sealed discharge processing of Step S5 in FIG. 2 described later) to adjust a concentration of gas inside at least one of the anode flow channel and the cathode flow channel. A stop method of a vehicle electrical power system according to the present invention is characterized by include the steps of: calculating a charge time (e.g., the remaining charge time of Step S52 in FIG. 6 described later) corresponding to a time in which charge processing can be executed, after the stop switch has been operated, by subtracting a time required in the concentration adjustment processing (e.g., the required stop discharge time of Step S51 in FIG. 6 described later) from a predetermined stop processing permitted time (e.g., the stop processing permitted time of Step S52 in FIG. 6 described later) (processing of Step S52 in FIG. 6 described later); calculating a target charge amount (e.g., the remaining target charge amount of Step S54 in FIG. 6 described later) of the electrical storage device (e.g., the processing of Step S2 in FIG. 2 and the processing of Step S54 in FIG. 6 described later); executing the charging processing while controlling output of the fuel cell based on the charge time and the target charge amount (e.g., the charge processing of Step S56 in FIG. 6 described later); and executing the concentration adjustment processing after the charge processing has ended (e.g., the sealed discharge processing of Step S5 in FIG. 2 described later).

According to a second aspect of the present invention, in this case, it is preferable for a withdrawn extent of electric power from the electrical storage device upon a next startup of the vehicle electrical power system to be estimated, and the target charge amount to be set to a larger value as the withdrawn extent increases, in the step of calculating a target charge amount.

According to a third aspect of the present invention, in this case, it is preferable to determine whether a season in which the stop switch was operated is winter, and in a case of being winter, the target charge amount to be set to a larger value than in a case of being a season other than winter, in the step of calculating a target charge amount.

According to a fourth aspect of the present invention, in this case, it is preferable to determine whether a current startup of the vehicle electrical power system is a low-temperature startup that is a startup under a low-temperature environment, and in a case of being a low-temperature startup, a vehicle startup time corresponding to a time period since the vehicle electrical power system was started until the stop switch was operated to be acquired, and in a case of the vehicle startup time being shorter than a predetermined time, the target charge amount to be set to a larger value than a case of the vehicle startup time being longer than the predetermined time, in the step of calculating a target charge amount.

According to a fifth aspect of the present invention, in this case, it is preferable for a value obtained by dividing a value obtained by subtracting a consumed energy of the load from an output energy of the fuel cell, by an energy inputted to the fuel cell in order to generate electric power with the fuel cell, to be defined as net efficiency; the load to include a compressor (e.g., the air compressor 41 described later) that supplies air as oxidant gas to the cathode flow channel; and in the step of executing the charging processing while controlling output of the fuel cell, the output of the fuel cell to be controlled so that charging of the target charge amount completes within the charge time and the net efficiency in the charge processing reaches an optimum.

According to a sixth aspect of the present invention, in this case, it is preferable for the load to include a cooling device (e.g., the cooling device 5 described later) that cools the fuel cell; and in the step of executing the charging processing while controlling output of the fuel cell, a net efficiency in a case of performing charge processing by controlling the output of the fuel cell to a predetermined first output value (e.g., the charge current value IFC1 in FIG. 7 described later) while cooling the fuel cell by way of the cooling device to be calculated as a first net efficiency (e.g., the first net efficiency of Step S64 in FIG. 7 described later), a net efficiency in a case of performing charge processing by controlling the output of the fuel cell to a second output value (e.g., the second charge current value IFC2 in FIG. 7 described later) that is smaller than the first output value so that cooling of the fuel cell by way of the cooling device is not necessary to be calculated as a second net efficiency (e.g., the second net efficiency in FIG. 7 described later), and the output of the fuel cell to be controlled to the first output value in a case of the first net efficiency being larger than the second net efficiency, and the output of the fuel cell to be controlled to the second output value in a case of the first net efficiency being no more than the second net efficiency.

According to a seventh aspect of the present invention, in this case, it is preferable for the concentration adjustment processing to include concentration reduction processing to cause an oxygen concentration inside of the cathode flow channel to decrease.

According to an eighth aspect of the present invention, a vehicle electrical power system (e.g., the fuel cell system 1 or hybrid vehicle electrical power system described later) includes: an electric power generation means (e.g., the fuel cell stack 2 or internal combustion engine and motor generator of the hybrid vehicle described later); an electrical storage device that stores electric power generated by the electric power generation means; and a stop switch that generates a signal to cause the electric power generation means to stop, in which the system executes charge processing (e.g., the charge processing of Step S56 in FIG. 6 or the charge processing of Step S95 in FIG. 9 described later) to charge electric power generated by the electric power generation means to the electrical storage device after the stop switch has been operated. The stop method of a vehicle electrical power system according to the present invention includes the steps of: calculating a target charge amount of the electrical storage device after the stop switch has been operated (e.g., the processing of Step S2 in FIG. 2 and processing of Step S54 in FIG. 6, or the processing of Steps S92 and S94 in FIG. 9 described later); and executing the charge processing by controlling output of the motor generator based on the target charge amount (e.g., the charge processing of Step S56 in FIG. 6 or processing of Step S95 in FIG. 9 described later), in which a withdrawn extent of electric power from the electrical storage device upon a next startup of the vehicle electrical power system is estimated, and the target charge amount is set to a larger value as the withdrawn extent increases, in the step of calculating a target charge amount.

With the present invention according to the first aspect, after operation of the stop switch, both charge processing to continue electric power generation by way of the fuel cell and charge to the electrical storage device, as well as concentration adjustment processing to adjust the concentration of gases inside of the anode flow channel and inside the cathode flow channel are performed. According to the present invention, by performing these two types of processing after operation of the stop switch, inside of the gas flow channels can be established in an appropriate state in preparation for during a subsequent startup, while ensuring the remaining amount required in the electrical storage device during a subsequent startup. Herein, the time required in the concentration adjustment processing is almost uniquely determined depending on the state of the fuel cell upon starting this processing; whereas, the time required in charge processing tends to adjust in length according to the controlling of the output of the fuel cell. With the present invention, a time obtained by deducting the time required in concentration adjustment processing from the predetermined stop processing permitted time is allotted to execution of the charge processing as a charge time. Then, the target charge amount of the electrical storage device is calculated, charge processing is executed while controlling the output of the fuel cell based on the fixed charge time and target charge amount, and after charge processing has completed, concentration adjustment processing is executed. With the present invention, it is thereby possible to complete both the charge processing and concentration adjustment processing so as not to exceed the predetermined stop processing permitted time. In other words, according to the present invention, since the sequence of stop processing consisting of charge processing and concentration adjustment processing will not prolong after operation of the stop switch, it is possible to mitigate the uncomfortable feeling given to a user, and to start maintenance as quickly as possible after the stop operation.

With the present invention according to the second aspect, the withdrawn extent of electric power from the electrical storage device upon a subsequent startup of the vehicle electric power system is estimated, the target charge amount is set to a larger value as the withdrawn extent increases, and the output of the fuel cell is controlled in the charge processing according to the set target charge amount. As much of a remaining amount as required upon a subsequent startup can thereby be ensured in the electrical storage device. However, when comparing between the electric power generation under a situation in which a relatively high load is required prior to a stop operation (hereinafter referred to as high load electric power generation or normal electric power generation) and electric power generation under a situation in which a relatively low load is required after a stop operation (hereinafter referred to as low load electric power generation or idle electric power generation), the low load electric power generation has lower electric power generation efficiency ((output energy of fuel cell)/(energy input to the fuel cell system in order to generate electric power with the fuel cell)) than the high load electric power generation. For this reason, charging to the electrical storage device according to charge processing after the stop operation is preferably stopped as minimally as possible. With the present invention, by changing the target charge amount depending on the estimation of the withdrawn extent, it is possible to charge the electrical storage device by way of charge processing after the stop operation, and thus minimally stop idle charge, which has a relatively low electric power generation efficiency.

With the present invention according to the third aspect, it is determined whether the season in which the stop switch is operated was winter, and in the case of being winter, the target charge amount is set to a larger value than a case of being a season other than winter, and the output of the fuel cell is controlled in charge processing according to the set target charge amount. In the case of being winter, in order to prevent residual water from freezing inside the system and prevent the fuel cell from degrading, extra energy over a case of being a season other than winter is required, and this energy is covered mainly by the electrical storage device. With the present invention, in the case of the season in which a stop operation is made being winter, the extra energy necessitated under the low-temperature environment of winter can be ensured in the electrical storage device by setting the target charge amount to a larger value than a case of being a season other than winter.

According to the fourth aspect, in the case of being low-temperature startup and being startup for a short time, warm up of the fuel cell does not complete at the moment when the stop operation was performed, and thus it is considered that the generated water accompanying electric power generation of the fuel cell did not become steam and sufficiently discharge from the gas flow channels. For this reason, in order to discharge moisture inside the gas flow channels by scavenging processing that is performed while soaked, a corresponding amount of extra energy becomes necessary. With the present invention, in the case of the present startup of the vehicle electric power system being low-temperature startup and being startup of a short time, (i.e. low-temperature startup quickly turned off), the target charge amount is set to a larger value than a case of not being as such. During low-temperature startup quickly turned off, the energy required in excess in order to perform the scavenging processing while soaked can thereby be ensured in the electrical storage device.

According to the fifth aspect, when setting the output energy of the fuel cell to be greater, it is possible to complete charging of the target charge amount in as much a shorter time; however, since the energy required in order to drive the load required for generating electric power with the fuel cell also increases, the net efficiency changes as well. With the charge processing of the present invention, the output of the fuel cell is controlled so that charging of the target charge amount completes within the charge time and the net efficiency of the charge processing reaches an optimum. Charging of the target charge amount can thereby be completed within the charge time efficiently with as little input energy as possible. Since low load electric power generation has low electric power generation efficiency compared to high load electric power generation as described above, controlling the output of the fuel cell to where the net efficiency reaches an optimum as in the present invention is particularly effective.

With the present invention according to the sixth aspect, the first net efficiency and second net efficiency are compared, and the output of the fuel cell is controlled in the more efficient mode. In other words, in the case of the first net efficiency being greater than the second net efficiency, cooling by the cooling device is also maintained while relatively increasing the output of the fuel cell, and in the case of the second net efficiency being greater than the first net efficiency, output of the fuel cell is controlled so that cooling by way of the cooling device becomes unnecessary. It is thereby possible to control output of the fuel cell to where the net efficiency taking account of the consumption of energy in the cooling device reaches an optimum.

With the present invention according to the seventh aspect, charge processing and concentration reduction processing to decrease the oxygen concentration inside of the cathode flow channel are performed after operation of the stop switch. It is thereby possible to ensure the remaining amount required in the electrical storage device during a subsequent startup, while suppressing the cathode side of the fuel cell from entering a high potential state upon the subsequent startup and degrading.

With the present invention according to the eighth aspect, after operation of the stop switch, the target charge amount of the electrical storage device is calculated, and charge processing is executed while controlling the output of the electric power generation means based on this target charge amount. In addition, with the present invention, the withdrawn extent of electric power from the electrical storage device in and after a subsequent startup of the vehicle electrical power system is estimated, and the target charge amount is set to a larger value as the withdrawn extent increases. It is thereby possible to ensure as much a remaining amount as required during a subsequent startup in the electrical storage device. In other words, with the present invention, by adjusting the target charge amount depending on the estimation of the withdrawn extent, it is possible to prevent the charge processing after the stop operation from prolonging more than necessary; therefore, it is possible to mitigate the uncomfortable feeling given to a user, and to start maintenance as quickly as possible after the stop operation.

BRIEF DESCRIPTION OF THE DRAWINGS

FIG. 9 is a flowchart showing a sequence of stop processing of the electrical power system of a hybrid vehicle according to a second embodiment of the present invention.

DETAILED DESCRIPTION OF THE INVENTION

First Embodiment

Hereinafter, a first embodiment of the present invention will be explained while referencing the drawings.

Figure 1:
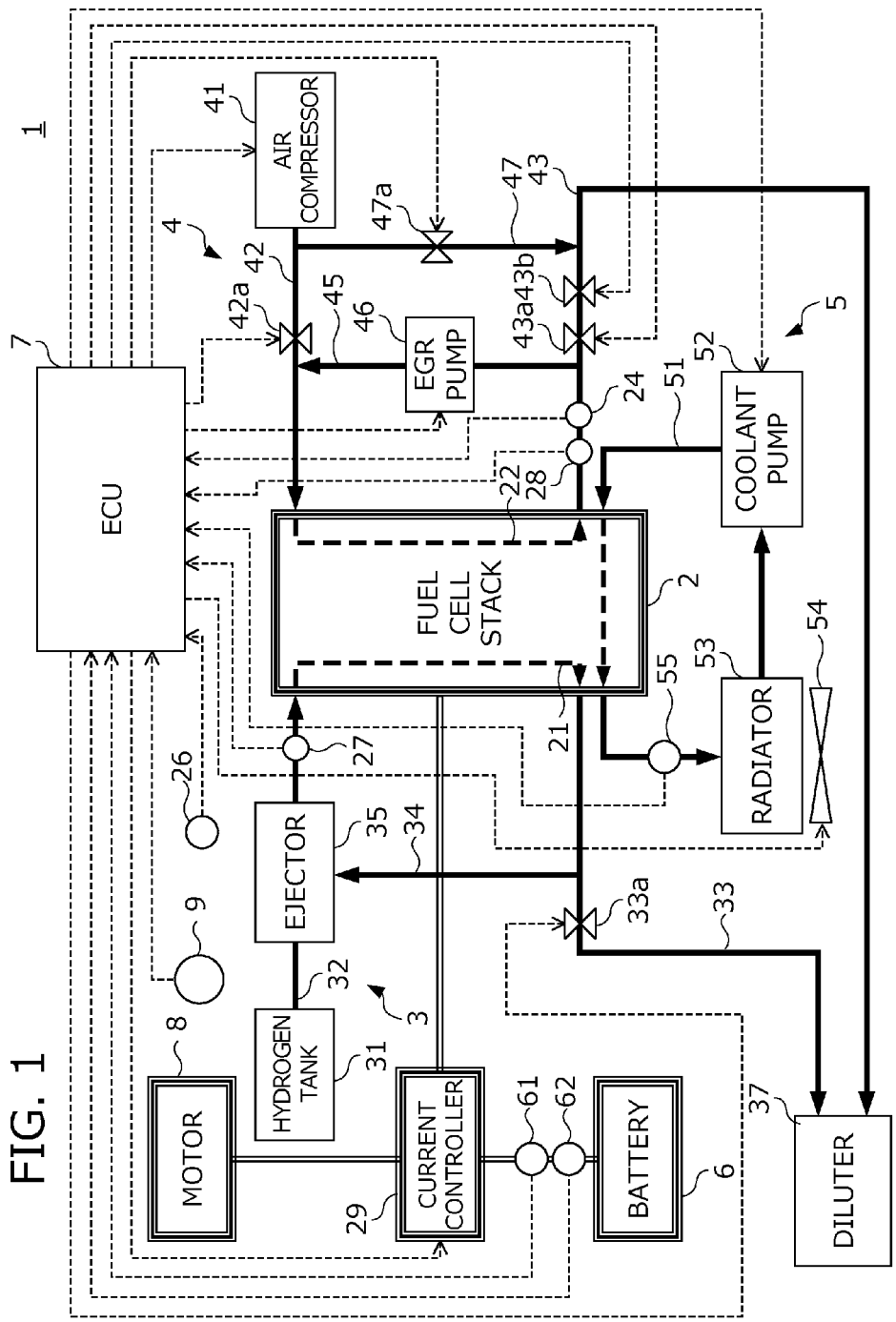
FIG. 1 is a view showing the configuration of a fuel cell system according to a first embodiment of the present invention.

FIG. 1 is a view showing the configuration of a fuel cell system 1 as a vehicle electrical power system according to the present embodiment.

The fuel cell system 1 includes a fuel cell stack 2, an anode system 3 that supplies hydrogen to the fuel cell stack 2 as fuel gas, a cathode system 4 that supplies air to the fuel cell stack 2 as oxidant gas, a diluter 37 that performs post processing of gas discharged from the fuel cell stack 2, a cooling device 5 that cools the fuel cell stack 2, a battery 6 that stores electric power generated by the fuel cell stack 2, an electronic control unit (hereinafter referred to as "ECU") 7, and a drive motor 8 that drives according to the supply of electric power from the fuel cell stack 2 and battery 6. The fuel cell system 1 is equipped to a fuel cell vehicle (not illustrated) that travels by way of the drive motor 8.

The fuel cell stack (hereinafter referred to simply as "stack") 2, for example, is a stack structure in which several tens to several hundreds of cells are laminated. Each cell of the fuel cell is configured by sandwiching a membrane electrode assembly (MEA) with a pair of separators. The membrane electrode assembly is configured by the two electrodes of an anode and cathode, and a solid polymer electrolyte membrane sandwiched by these electrodes. Usually, both electrodes are formed from a catalyst layer that contacts the solid polymer electrolyte membrane to carry out oxidation/reduction reaction, and a gas diffusion layer that contacts this catalyst layer. When hydrogen is supplied to an anode flow channel 21 formed on the anode side and air containing oxygen is supplied to a cathode flow channel 22 formed on the cathode side, the stack 2 generates electric power according to the electrochemical reaction of these.

The output current produced from the stack 2 during electric power generation is input to the battery 6 and/or a load (drive motor 8, air compressor 41, etc.) via a current controller 29. The current controller 29 includes a DC-DC converter (not illustrated), and controls the output current of the stack 2 during electric power generation according to a chopping action thereof. Particularly in the charge during stop processing described later, the current controller 29 sets the output current of the stack 2 as the charge current of the battery 6, and controls this to a predetermined current command value, while recharging the battery 6 over a predetermined time.

The battery 6 stores electric power generated by the stack 2 and electrical energy recovered as regenerative braking power by the drive motor 8. In addition, during startup of the fuel cell system and during high load operation of the vehicle, for example, the electric power stored in the battery 6 is supplied to the load so as supplement the output of the stack 2.

The anode system 3 is configured to include a hydrogen tank 31, a hydrogen supply line 32 that reaches an introduction part of the anode flow channel 21 of the stack 2 from the hydrogen tank 31, a hydrogen discharge line 33 that reaches the diluter 37 from a discharge part of the anode flow channel 21, and a hydrogen recirculation line 34 that branches from the hydrogen discharge line 33 to reach the hydrogen supply line 32.

The hydrogen tank 31 stores hydrogen gas at high pressure. An ejector 35 that supplies new hydrogen supplied from the hydrogen tank 31 along with hydrogen-containing gas introduced via the hydrogen recirculation line 34 towards the stack 2 inside of the hydrogen supply line 32 is provided in the hydrogen supply line 32. A hydrogen circulation flow channel of gas containing hydrogen is configured by the hydrogen supply line 32, anode flow channel 21, hydrogen discharge line 33 and hydrogen recirculation line 34.

A purge valve 33a is provided in the hydrogen discharge line 33 on a downstream side from a connecting part with the above-mentioned hydrogen recirculation line 34. If the hydrogen concentration of gas recirculated in the hydrogen circulation flow channel declines, the electric power generation efficiency of the stack 2 will decline. Therefore, the purge valve 33a is opened at an appropriate timing during electric power generation of the stack 2, and the gas inside of the hydrogen circulation flow channel is discharged to the diluter 37, while new hydrogen gas is introduced from the hydrogen tank 31 into the hydrogen circulation flow channel.

The cathode system 4 is configured to include the air compressor 41, an air supply line 42 that reaches from the air compressor 41 to an introduction part of the cathode flow channel 22, an air discharge line 43 that reaches from a discharge part of the cathode flow channel 22 to the diluter 37, and an air recirculation line 45 that branches from the air discharge line 43 and reaches the air supply line 42.

The air compressor 41 supplies air from outside the system to the cathode flow channel 22 of the stack 2 via the air supply line 42. In addition, a pressure control valve 43b for adjusting the pressure inside of the cathode flow channel is provided to the air discharge line 43. The pressure inside of the cathode flow channel 22 of the stack 2 during electric power generation is controlled to an appropriate magnitude according to the electric power generation state of the stack 2, by adjusting the aperture of the pressure control valve 43b while supplying air by way of the air compressor 41.

An EGR pump 46 that pressure feeds gas on the air discharge line 43 side to the air supply line 42 is provided to the air recirculation line 45. An oxygen circulation flow channel of gas containing oxygen is configured by the air supply line 42, cathode flow channel 22, air discharge line 43 and air recirculation line 45.

A first sealing valve 42a that prevents ambient air from flowing in from the air compressor 41 side to the cathode flow channel 22 side during stop of the system 1 is provided in the air supply line 42 more on the air compressor 41 side than a connecting part with the air recirculation line 45. In addition, a second sealing valve 43a that prevents ambient air from flowing in from the diluter 37 side to the cathode flow channel 22 side during stop of the system 1 is provided in the air discharge line 43 more on the diluter 37 side than a branching part with the air recirculation line 45. These sealing valves 42a and 43a are closed in the system stop processing described later (e.g., refer to sealed discharge processing of FIG. 5 described later) described later, so as to seal the cathode flow channel 22 and suppress degradation of the stack 2.

In addition, a bypass line 47 that connects between the first sealing valve 42a and air compressor 41 in the air supply line 42 and between the second sealing valve 43a and diluter 37 in the air discharge line 43 is provided to the cathode system 4. Therefore, by opening a bypass valve 47a provided in the bypass line 47 and driving the air compressor 41, it is possible to supply a large amount of air from the air compressor 41 to the diluter 37 in a short time, circumventing the stack 2.

The diluter 37 dilutes gas containing hydrogen discharged from the hydrogen discharge line 33 with gas introduced from the air discharge line 43 as diluent gas, and discharges out of the system.

The cooling device 5 includes a coolant circulation flow channel 51 that includes the stack 2 in the channel, a coolant pump 52 that pressure feeds coolant inside of the coolant circulation flow channel 51 in a predetermined direction, a radiator 53 that forms a part of the coolant circulation flow channel 51, and a radiator fan 54 that cools the coolant flowing through the radiator 53. The cooling device 5 is configured so not to allow a maximum temperature determined in order to protect the stack 2 to be exceeded, by way of circulating coolant by the coolant pump 52 to ensure heat exchange between the stack 2 and coolant, as well as cooling the coolant by way of the radiator fan 54.

It should be noted that, in the above such fuel cell system 1, the load driven by the supply of electric power from the stack 2 and battery 6 is configured by the drive motor 8, air compressor 41, EGR pump 46, coolant pump 52, radiator fan 54, etc.

Various sensors such as an exhaust temperature sensor 24, coolant temperature sensor 55, ambient air temperature sensor 26, anode pressure sensor 27, cathode pressure sensor 28, battery current sensor 61 and battery voltage sensor 62 for detecting the state of the fuel cell system 1 are connected to the ECU 7.

The exhaust temperature sensor 24 detects the temperature of gas discharged from the cathode flow channel 22 of the stack 2, and sends a signal substantially proportional to the detected value to the ECU 7. The temperature of the stack 2 is calculated by the ECU 7 based on the output of the exhaust gas sensor 24.

The coolant temperature sensor 55 detects the temperature of coolant in the coolant circulation flow channel 51 on an outlet side of the stack 2, and sends a signal substantially proportional to the detected value to the ECU 7. The ambient air temperature sensor 26 detects the temperature of ambient air, and sends a signal substantially proportional to the detected value to the ECU 7. The anode pressure sensor 27 detects the pressure inside of the hydrogen circulation flow channel (hereinafter referred to as "anode pressure"), and sends a signal substantially proportional to the detected value to the ECU 7. The cathode pressure sensor 28 detects the pressure inside of the oxygen circulation flow channel (hereinafter referred to as "cathode pressure"), and sends a signal substantially proportional to the detected value to the ECU 7.

The battery current sensor 61 detects the output current of the battery 6, and sends a signal substantially proportional to the detected value to the ECU 7. The battery voltage sensor 62 detects the output voltage of the battery 6, and sends a signal substantially proportional to the detected value to the ECU 7. The remaining capacity of the battery 6 is calculated by the ECU 7 based on the outputs of these sensors 61 and 62.

A power switch 9 that is operated by the driver in order to command the start of electric power generation by the stack 2 (i.e. startup of the fuel cell system 1) or stop of electric power generation by the stack 2 (i.e. stop of the fuel cell system 1) is provided at the driver's seat of the vehicle (not illustrated).

The power switch 9 generates a signal commanding startup of the system 1 when operated in a state in which the fuel cell system 1 is stopped. The ECU 7 starts the system startup processing when receiving the startup command signal from the power switch 9. In the system startup processing, the electric power stored in the battery 6 is used to drive the load, and the vehicle travels, along with setting the stack 2 to a state capable of electric power generation. In addition, after the stack 2 enters a state capable of electric power generation, a contactor (not illustrated) is closed at a predetermined timing to electrically connect the stack 2 and the battery 6 or load, and startup of the system ends.

The power switch 9 generates a signal commanding the stop of the system 1 when operated in a state in which the fuel cell system 1 has started up. With the condition of having received the stop command signal from the power switch 9, the ECU 7 starts the system stop processing, which will be explained in detail later while referencing FIG. 2. The ECU 7 opens the above-mentioned contactor to electrically isolate the stack 2 and battery 6 or load, when the system stop processing ends.

Figure 2:
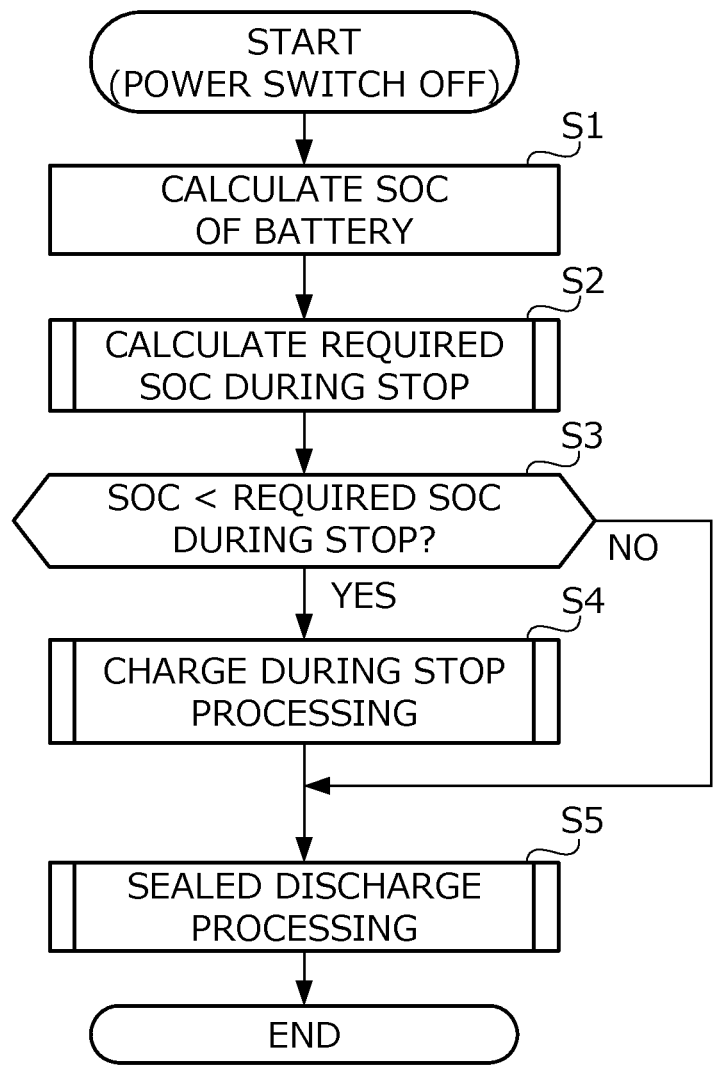
FIG. 2 is a main flowchart showing a sequence of system stop processing of the fuel cell system.

FIG. 2 is a main flowchart showing the sequence of system stop processing.

In Step S1, the current SOC (%) of the battery is calculated, and then the processing advances to Step S2. It should be noted that the SOC of the battery is a value in which the current remaining capacity (kW) is represented by a percentage with the rated capacity of the battery as 1, and is calculated by way of processing (not illustrated) based on the outputs of the battery current sensor and battery voltage sensor. It should be noted that, hereinafter, the remaining capacity, charge amount, etc. of the battery will be explained in units of a value represented by a percentage with the rated capacity of the battery as 1.

In Step S2, a required SOC during stop is calculated, and then the processing advances to Step S3. This required SOC during stop corresponds to the remaining capacity that is minimally demanded in the battery upon stopping the system in order to ensure appropriate startup of the fuel cell system subsequently. In addition, this required SOC during stop is also a threshold set for the current SOC calculated in Step S1 in order to determine whether it is necessary to execute the charge during stop processing described later. The specific sequence of calculating this required SOC during stop will be explained later while referencing FIGS. 3 and 4.

In Step S3, it is determined whether the current SOC is smaller than the required SOC during stop. In the case of the current SOC being smaller than the required SOC during stop, it is determined that it is necessary to charge the battery in preparation for the next startup, and after executing charge during stop processing explained later while referencing FIG. 5 (Step S4), the sealed discharge processing explained later while referencing FIG. 6 is executed (Step S5), and then the system stop processing is ended. In addition, in the case of the current SOC being at least the required SOC during stop, it is determined that the remaining capacity of the battery is sufficient, and only the sealed discharge processing is executed (Step S5) without executing the charge during stop processing, and then the system stop processing is ended.

Figure 3:
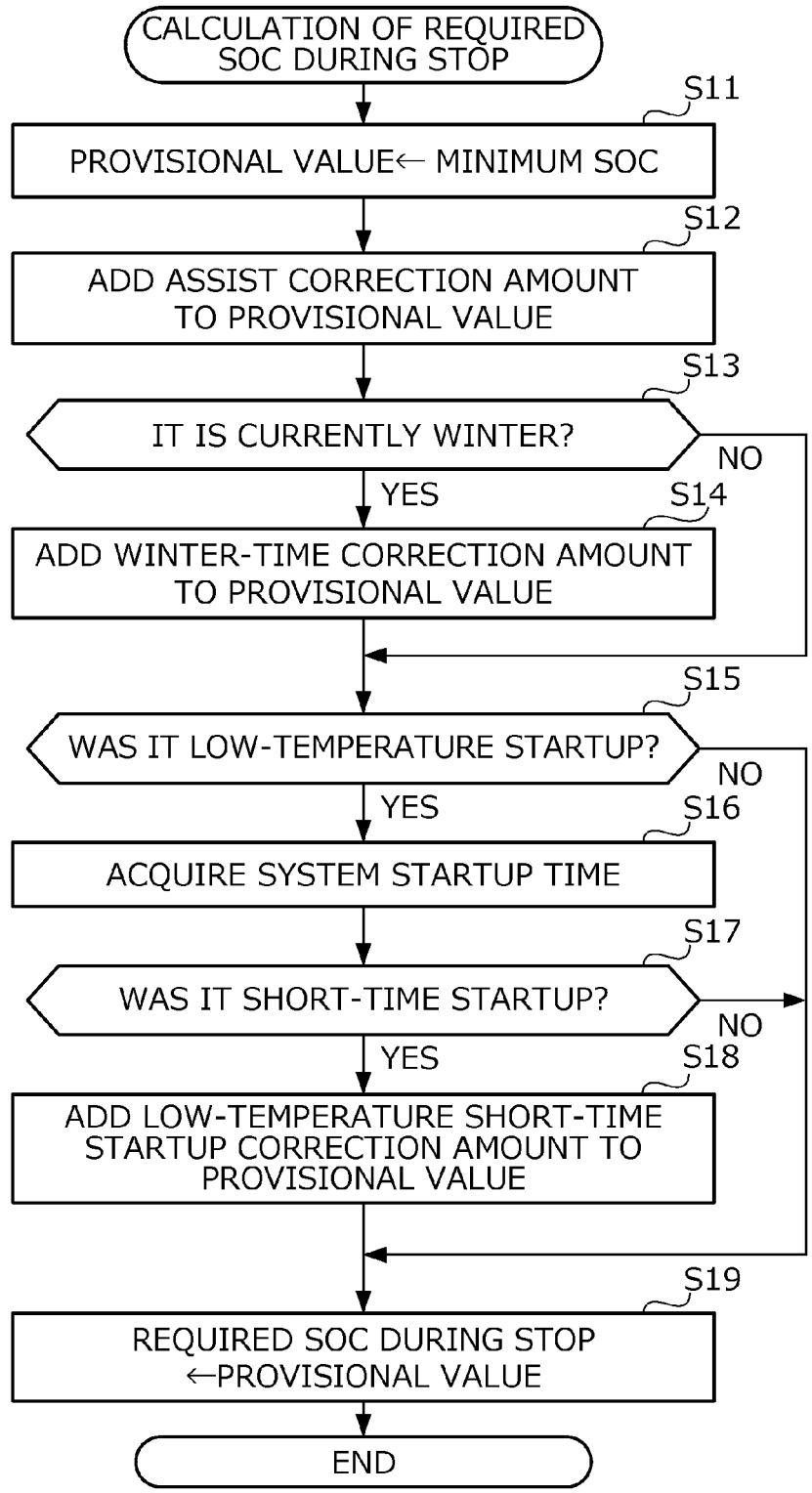
FIG. 3 is a flowchart showing a sequence of calculating a required SOC during stop.

FIG. 3 is a flowchart showing the sequence of calculating the required SOC during stop.

Figure 4:
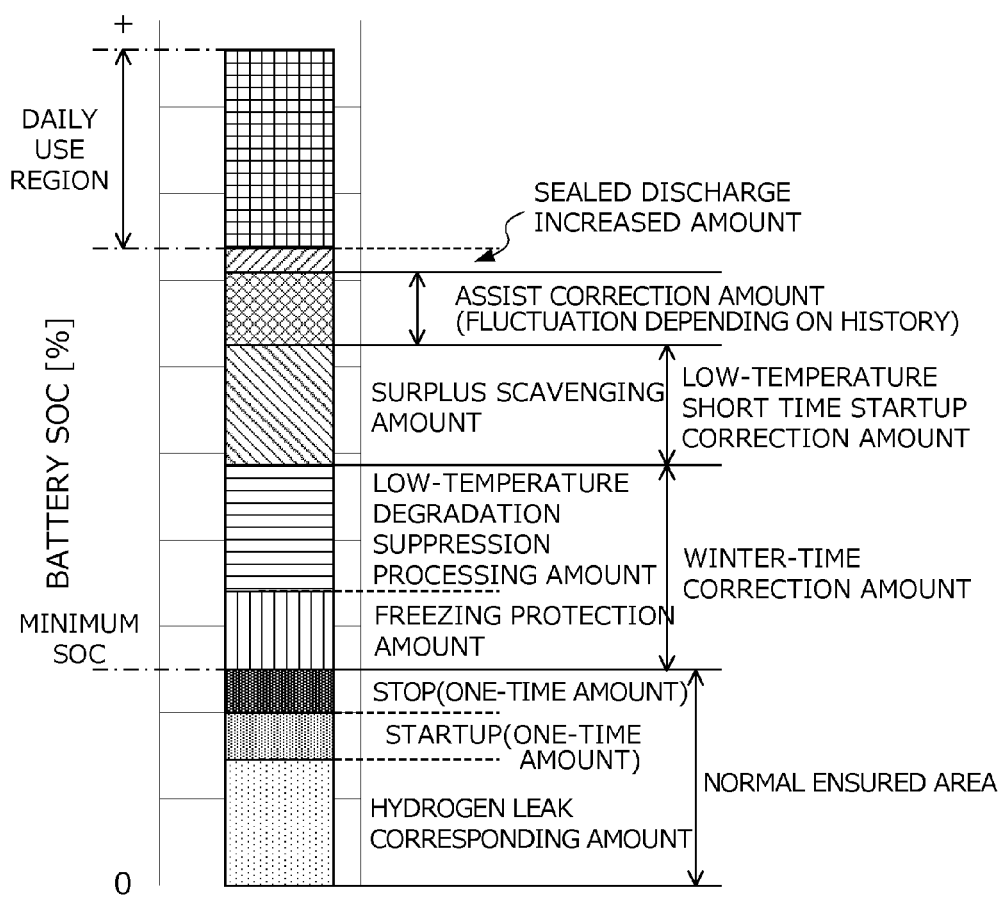
FIG. 4 is a view in which a remaining capacity of a battery is schematically divided by use thereof.

FIG. 4 is a view in which the remaining capacity of the battery is schematically divided by use thereof. Hereinafter, the sequence of calculating the required SOC during stop in FIG. 3 will be explained while referencing FIG. 4.

In Step S11, a minimum SOC corresponding to the minimum value of the required SOC during stop is calculated, this is set as a provisional value of the required SOC during stop, and then the processing advances to Step S12. This minimum SOC corresponds to the electric power minimally ensuring upon stopping the system. This minimum SOC includes the electric power required in order to startup the system only one time, the electric power required in order to stop the started system only one time, and the electric power required in order to perform corresponding processing (e.g., ventilation of hydrogen) in the case of a hydrogen leak having occurred.

In Step S12, an assist correction amount is calculated, this is added to the provisional value, and then the processing advances to Step S13. As described above, the fuel cell vehicle can configure so as to supplement a deficiency in the output of the stack and travel, by way of supplying electric power from the battery to the drive motor. In this way, the withdrawn extent of electric power from the battery for supplementing the output shortage of the stack upon causing the fuel cell vehicle to travel changes, for example, depending on the magnitude of the acceleration demand of the driver, frequency of acceleration demands, etc., and can be estimated from the past travel history. Therefore, in Step S12, the withdrawn extent of electric power from the battery since subsequent startup of the system is estimated by referencing the past travel history, and the assist correction amount is calculated so as to be a larger value as the withdrawn extent increases. By adding such an assist correction value to the provisional value, the required SOC during stop is corrected to a larger value as the withdrawn extent of electric power from the battery increases.

In Step S13, it is determined whether the present time, i.e. season in which the stop switch was operated, is winter. Information related to the season during a stop operation is acquired by way of a GPS communication means (not illustrated), for example. In the case of the determination of Step S13 being NO and the current season not being winter, the processing advances to Step S15.

In the case of the determination of Step S13 being YES and the current season being winter, the processing advances to Step S14. In Step S14, a winter-time correction amount is calculated, this is added to the provisional value, and then the processing advances the Step S15. This winter-time correction amount includes the electric power required in order to prevent residual water from freezing inside of the system in the low temperature environment of winter (freezing protection amount), and the electric power required in order to execute processing that is performed in order to suppress the stack from degrading under a low temperature environment (low-temperature degradation-suppression processing amount), as shown in FIG. 4. By adding such a winter-time correction amount to the provisional value, the required SOC during stop is corrected to a larger value than in the case of not being winter.

In Step S15, the past startup history is referenced to determine whether the present startup of the system is low-temperature startup. Herein, low-temperature startup refers to starting up the system, for example, from a state in which the stack is lower than a predetermined judgment temperature (e.g., 0° C.). In the case of the determination of Step S15 being NO and the present startup not being low-temperature startup (case of being normal-temperature startup), the processing advances to Step S19.

In the case of the determination of Step S15 being YES and the present startup being low-temperature startup, the processing advances to Step S16. In Step S16, a present system startup time is acquired, and then the processing advances to Step S17. This present system startup time corresponds to a time since present startup of the system was commanded until stop is commanded. In Step S17, it is determined whether the present startup was short-time startup by comparing between the acquired system startup time and a predetermined threshold. In the case of the determination of Step S17 being NO, i.e. in the case of the present startup being low-temperature startup and not being short-time startup, the processing advances to Step S19.

In the case of the determination of Step S17 being YES, i.e. in the case of the present startup being low-temperature startup and short-time startup, i.e. in the case of being low-temperature startup quickly turned off, the processing advances to Step S18. In Step S18, a low-temperature short-time startup correction amount is calculated, this is added to the provisional value, and then the processing advances to Step S19. In the case of being such a low-temperature startup quickly turned off, warm up of the fuel cell does not complete at the moment when the stop operation was performed, and thus it is considered that the generated water accompanying electric power generation of the stack did not become steam and sufficiently discharge from the gas flow channels. For this reason, in order to discharge moisture remaining inside the gas flow channels by scavenging processing that is performed while the stack is soaked, a corresponding amount of extra energy becomes necessary. This low-temperature short-time startup correction amount corresponds to the electric power necessitated in extra in order to perform such scavenging processing, as shown in FIG. 4. In the case of being low-temperature startup quickly turned off, the required SOC during stop is corrected to a larger value than a case of not being as such, by adding such a low-temperature short-time startup correction amount to the provisional value.

In Step S19, the provisional value calculated in the above way is determined as a final required SOC during stop, and this processing is ended.

It should be noted that, since electric power generation is continued by the stack even during execution of sealed discharge processing, which is performed after the charge during stop processing finishes, it is possible to charge the battery with the electric power generated by the stack during sealed discharge processing. Therefore, for the aforementioned minimum SOC or assist correction amount, the increase in SOC by sealed discharge performed after charge processing may be estimated, and the increased amount by this sealed discharge processing may be subtracted. In the sealed discharge processing, electric power generation of the stack is continued until the oxygen concentration inside of the oxygen circulation flow channel falls below a defined concentration (e.g., about 0); however, the amount of oxygen consumed in this sealed discharge processing is almost uniquely determined according to the volume, etc. of the circulation flow channel, for example, and does not greatly change every time stopping the system. Therefore, the increased amount of SOC by performing sealed discharge processing can also be theoretically calculated in advance.

Figure 5:
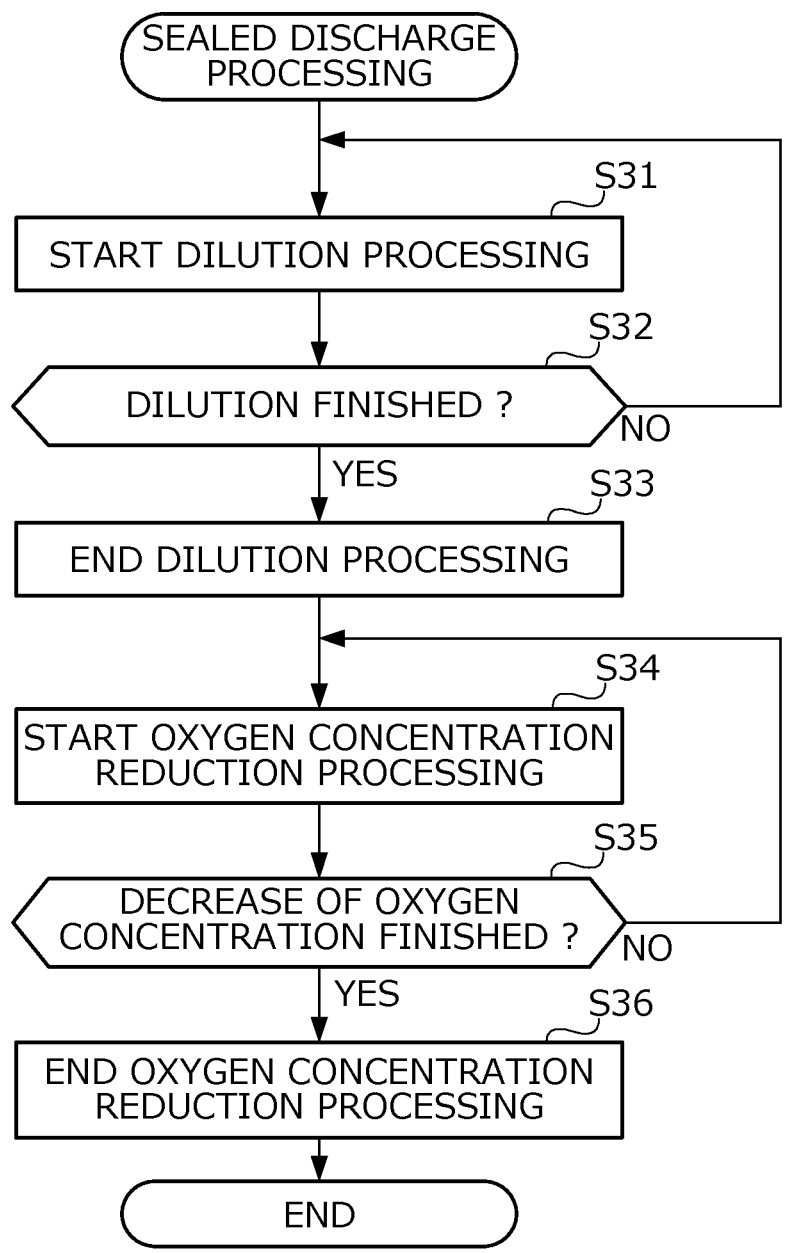
FIG. 5 is a flowchart showing a sequence of sealed discharge processing.
Figure 6:
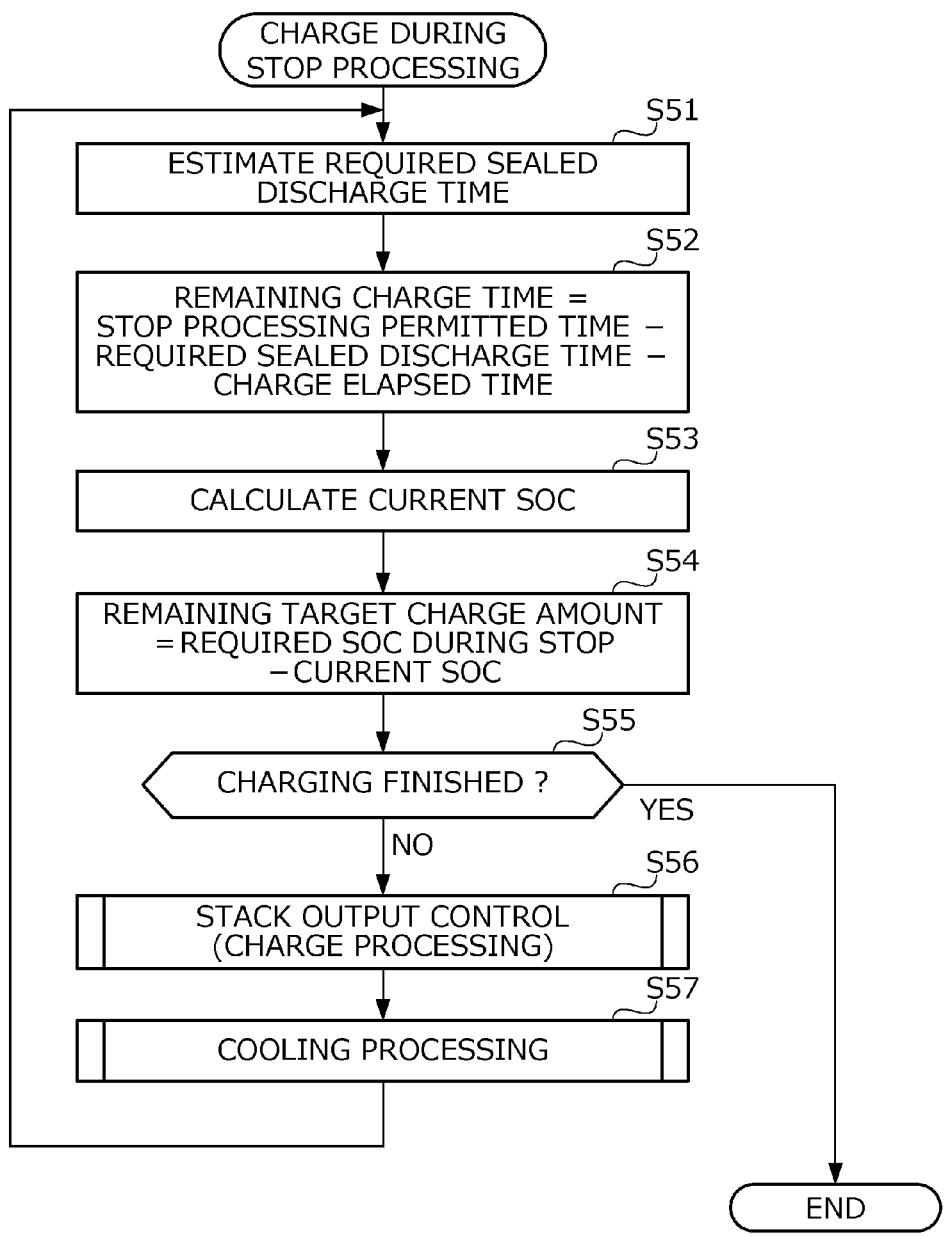
FIG. 6 is a flowchart showing a sequence of charge during stop processing.

FIG. 5 is a flowchart showing the sequence of sealed discharge processing. As shown in FIG. 5, the sealed discharge processing consists of oxygen concentration reduction processing (Steps S34 to S36) for decreasing the oxygen concentration inside of the oxygen circulation flow channel, and dilution processing (Steps S31 to S33) as pre-processing of this oxygen concentration reduction processing. In the oxygen concentration reduction processing, electric power generation is continued in a state in which the air compressor is stopped and the supply of air from outside the system is substantially stopped; however, the amount of diluent gas introduced to the diluter also declines when the air compressor is stopped. For this reason, while performing the oxygen concentration reduction processing, there is concern over dilution of hydrogen by the diluter not being sufficient. Therefore, before the oxygen concentration reduction processing, dilution processing is performed to dilute the hydrogen remaining inside of the diluter. Hereinafter, specific sequences of this dilution processing and oxygen concentration reduction processing will be explained.

In Step S31, dilution processing to supply a large amount of air to the diluter so as to dilute the hydrogen inside the diluter in a short time is started, and then the processing advances to Step S32. More specifically, in Step S31, the air compressor is driven along with opening the bypass valve for the cathode system, and air is supplied from the air compressor directly to the diluter. In addition, for the anode system, the supply of new hydrogen from the hydrogen tank is stopped, along with decreasing the pressure inside of the hydrogen circulation flow channel, in preparation for the start of oxygen concentration reduction processing.

In Step S32, it is determined whether the dilution of hydrogen has ended. More specifically, it is determined whether the hydrogen concentration inside of the diluter (or amount of hydrogen in the gas inside of the diluter) has fallen below a predetermined concentration, or alternatively, it is determined whether a time has elapsed of an extent that allows for judgment that the hydrogen concentration inside of the diluter has sufficiently declined since starting the dilution processing of Step S31. Herein, the hydrogen inside of the diluter is introduced by opening of a purge valve; therefore, the hydrogen concentration inside of the diluter is estimated based on the open/close history of the purge valve. In the case of the determination of Step S32 being NO, the processing returns to Step S31, and dilution processing is continued. In the case of the determination of Step S32 being YES, after the processing advances to Step S33 and dilution processing is finished, the processing advances to Step S34. More specifically, in Step S33, the bypass valve is closed, along with stopping the air compressor.

In Step S34, oxygen concentration reduction processing to cause the oxygen concentration inside of the oxygen circulation flow channel to decrease is started, and then the processing advances to Step S35. More specifically, in Step S34, the second sealing valve is closed along with driving the EGR pump, to cause gas to circulate inside of the oxygen circulation flow channel while stopping the supply of new air from outside the system. In other words, by causing the oxygen in the gas circulating inside of the oxygen circulation flow channel to be consumed in electric power generation of the stack 2, the oxygen concentration of gas inside of the oxygen circulation flow channel is decreased.

In Step S35, it is determined whether the decrease in oxygen concentration has finished. More specifically, in Step S35, it is determined whether the oxygen concentration inside of the oxygen circulation flow channel (or amount of oxygen inside of the oxygen circulation flow channel) has fallen below a predetermined judgment concentration (e.g., about 0), or alternatively, whether a time has elapsed of an extent that allows for judgment that the oxygen concentration inside of the oxygen circulation flow channel has sufficiently declined since starting the oxygen concentration reduction processing of Step S34. In the case of the determination of Step S35 being YES, the processing advances to Step S36, the oxygen concentration reduction processing is ended, and then the sealed discharge processing is ended. More specifically, in Step S36, by stopping the EGR pump along with closing the first sealing valve and second sealing valve, the cathode flow channel of the stack is sealed in a state filled with gas in which the oxygen concentration has been sufficiently lowered. It should be noted that, in the oxygen concentration reduction processing of Steps S34 to S36, by driving the EGR pump in a state closing only the second sealing valve, gas is made to circulate inside of the oxygen circulation flow channel while stopping the supply of new air; however, it is not limited thereto and both the first sealing valve and second sealing valve may be closed.

FIG. 6 is a flowchart showing the sequence of charge during stop processing.

In charge during stop processing, a defined amount within a defined time is charged to the battery by controlling the output of the stack in accordance with the following sequence.

In Step S51, the time required in the sealed discharge processing (hereinafter referred to as "required sealed discharge time") is estimated, and then the processing advances to Step S52. This sealed discharge processing is configured by the dilution processing and oxygen concentration reduction processing as mentioned above.

In the dilution processing, the hydrogen remaining inside of the diluter is diluted with air supplied from the compressor as mentioned above. Therefore, the time required in dilution processing can be calculated theoretically based on the amount of hydrogen remaining inside of the diluter upon starting dilution processing. In addition, since the hydrogen inside of the diluter is introduced by opening the purge valve, this amount of hydrogen remaining inside of the diluter can be estimated based on the open/close history of the purge valve.

In the oxygen concentration reduction processing, electric power generation of the stack is continued until the oxygen concentration inside of the oxygen circulation system falls below a defined concentration. Therefore, the time required in this oxygen concentration reduction processing varies depending on the state of the stack upon starting the oxygen concentration reduction processing, i.e. the extent of consumption of oxygen and hydrogen of the stack. Therefore, the time required in oxygen concentration reduction processing can be estimated based on parameters correlated to the extent of consumption of oxygen and hydrogen of the stack, such as the anode pressure, cathode pressure and stack temperature upon starting this processing. In Step S51, the required sealed discharge time is estimated by totaling the time required in dilution processing and the time required in oxygen concentration reduction processing estimated in the above way.

In Step S52, a remaining charge time corresponding to a time that can complete charge processing is calculated by subtracting the above-mentioned required sealed discharge time calculated in Step S51 and a time elapsed thus far since starting the charge during stop processing in FIG. 6 (hereinafter referred to as "charge elapsed time") from a stop processing permitted time determined in advance, and then the processing advances to Step S53. Herein, stop processing permitted time corresponds to a time allotted to charge during stop processing and sealed discharge processing, and is set in advance in consideration of maintenance, system durability, etc. of the fuel cell vehicle. For example, maintenance of the fuel cell vehicle may be wanted to be performed as soon as possible after a stop operation of the power switch by the driver. If considering such maintenance, it is preferable for the stop processing permitted time to be as short as possible. In addition, even after a stop operation of the power switch by the driver, hydrogen and oxygen remain in the anode system and cathode system, and if a state continues in which the release voltage of the stack stays high, the MEA may degrade. When considering such system durability, it is preferable for the stop processing permitted time to be as short as possible. However, when considering the minimally required time in order to complete charge during stop processing and the minimally required time in order to complete sealed discharge processing, the stop processing permitted time cannot be excessively shortened. As a result of considering these matters, the stop processing permitted time is set to on the order of 3 minutes, for example.

In Step S53, the current SOC of the battery is calculated, and then the processing advances to Step S54. In Step S54, a value arrived at by subtracting the current SOC calculated in Step S53 from the required SOC during stop calculated in Step S2 of FIG. 2 is defined as a remaining target charge amount (%), and then the processing advances to Step S55. This remaining target charge amount corresponds to a charge amount required in order to charge the SOC of the battery until the required SOC during stop.

In Step S55, it is determined whether charging of the battery has finished. More specifically, in the case of the remaining target charge amount calculated in Step S54 having become no more than 0, for example, i.e. in the case of the current SOC having become at least the required SOC during stop, it is determined that charging of the battery has finished. In addition, it is determined that charging of the battery has finished also in the case of the remaining charge time calculated in Step S52 having become no more than 0, even if the remaining target charge amount has not become no more than 0. In the case of the determination of Step S55 being YES, the charge during stop processing in FIG. 6 is ended. In the case of the determination of Step S55 being NO, the processing advances to Step S56.

In Step S56, the output of the stack (charge current to the battery) is controlled based on remaining charge time calculated in Step S52 and the remaining target charge amount calculated in Step S54 so as to charge the battery. Herein, the charge current drawn from the stack is controlled so that charging of the remaining target charge amount finishes before the remaining charge time is 0, and the net efficiency described later reaches an optimum. The specific sequence of this stack output control will be explained later while referencing FIG. 7.

In Step S57, cooling processing to cool the stack during electric power generation is executed as necessary, and then the processing returns to Step S51. In the charge during stop processing, electric power generation of the stack is continued even after operation of the power switch, and then the temperature of the stack rises depending on the output of the stack. In the cooling processing of Step S57, the cooling device is controlled so that the temperature of the stack does not exceed a maximum temperature determined in order to protect the stack. The specific sequence of this cooling processing will be explained later while referencing FIG. 8.

In the above way, in the charge during stop processing of the present embodiment, calculation of parameters such as the required sealed discharge time, remaining charge time and remaining target charge amount (Steps S51 to S54) and output control of the stack based on these parameters (Step S56) are repeatedly executed until it is determined that charging has finished in Step S55. The state of the stack changes when performing electric power generation with the stack. In addition, when the state of the stack changes, the time required in the sealed discharge processing performed subsequently also changes. In the charge during stop processing of FIG. 6, while continuing electric power generation of the stack to perform charge processing, the required sealed discharge time is updated successively in response to the state of the stack at this time, the remaining charge time is corrected in response thereto, and further, the output of the stack is controlled based on this corrected remaining charge time. Therefore, according to the charge during stop processing of FIG. 6, since it is possible to accurately estimate the required sealed discharge time according to the state of the stack, which changes from one minute to the next, it is possible to charge the battery so as not to exceed the defined stop processing permitted time.

Figure 7:
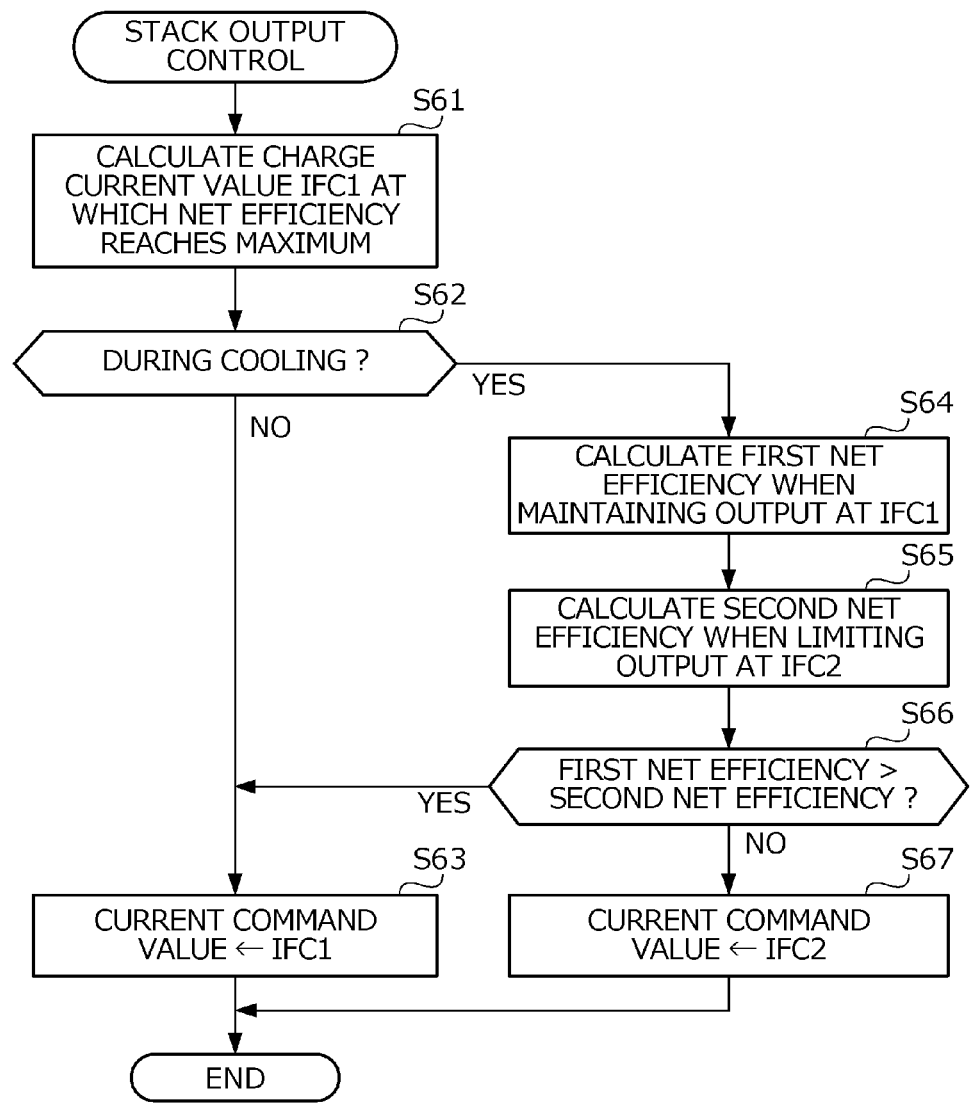
FIG. 7 is a flowchart showing a specific sequence of stack output control.

FIG. 7 is a flowchart showing the specific sequence of output control of the stack (Step S56 in FIG. 6). In the processing shown in FIG. 7, a current command value corresponding to the command value for the charge current so that the net efficiency in charge processing reaches an optimum is set in accordance with the sequence explained below.

In the below explanation, the net efficiency while performing charge processing is defined as a value arrived at by subtracting the energy consumed by the load while performing charge processing from the output energy of the stack while performing charge processing, and then dividing this by the energy input to the stack in order to generate electric power with the stack while performing charge processing (refer to below equation (1)).

$$\text{Net efficiency} = (\text{output energy of stack} - \text{consumed energy of load})/(\text{input energy to stack}) \quad (1)$$

In Step S61, charging of the remaining target charge amount finishes before a remaining charge time elapses, and a first charge current value IFC1 such that the net efficiency of charge processing reaches a maximum is calculated based on an arithmetic expression, map or like determined in advance. However, in the calculation of this first charge current value IFC1, it is not configured so that the consumed energy of the cooling device is considered in the net efficiency. It should be noted that optimization of the net efficiency arrived at by considering the consumed energy of the cooling device is performed in Steps S64 to S66 later.

For example, if trying to finish charging of the remaining target charge amount in the remaining charge time, a minimum value for the charge current value is fixed. Then, if the charge current value is made larger than this minimum value, the charge time shortens by a corresponding amount; however, the consumed energy of the compressor increases. In Step S61, the first charge current value IFC1 that is larger than the above-mentioned minimum value is calculated so that the net efficiency reaches a maximum, by considering the consumed energy of the compressor.

In Step S62, it is determined whether it is during cooling of the stack. In other words, it is determined whether the cooling device is currently being driven to cool the stack. It should be noted that whether or not the cooling device is being driven to cool the stack is determined depending on the current temperature of the stack in the processing shown in FIG. 8.

In the case of the determination of Step S62 being NO, i.e. in the case of not currently being during cooling, the processing advances to Step S63, the first charge current value IFC1 calculated in Step S61 is set as the current command value, and then the processing advances to Step S57 of FIG. 6.

In the case of the determination of Step S62 being YES, i.e. in the case of currently being during cooling, the processing of Step S64 and later is executed, and a current command value such that the net efficiency reaches a maximum is set by also considering the cooling state according to the cooling device.

In Step S64, the net efficiency is calculated in the case of maintaining the current command value of the stack at the first charge current value IFC1 and continually charging the battery while cooling the stack by way of the cooling device, and this is defined as a first net efficiency.

In Step S65, the net efficiency is calculated in the case of limiting the current command value of the stack to a second charge current value IFC2 that is smaller than the first charge current value IFC1, so that cooling by the cooling device is no longer necessary, and this is defined as a second net efficiency. However, the second charge current value IFC2 is made a value larger than the minimum value calculated in Step S61, so that charging of the remaining target charge amount finishes within the remaining charge time.

In Step S66, it is determined whether the first net efficiency is larger than the second net efficiency. For example, if increasing the output of the stack, the charge time will shorten by a corresponding amount; however, since the amount of heat generation will also increase, the consumed energy of the cooling device increases as well. On the other hand, if limiting the output of the stack to be small, the amount of heat generation will decrease; therefore, the consumed energy of the cooling device will also decrease; however, the charge time will become longer by a corresponding amount. For this reason, the first net efficiency may be larger, or the second net efficiency may be larger.

In the case of the determination of Step S66 being YES, it is determined that continuing charging without limiting the output current of the stack even though continuing cooling by way of the cooling device can charge at a better energy efficiency, and then the processing advances to the aforementioned Step S63.

In the case of the determination of Step S66 being NO, it is determined that limiting the output of the stack so that cooling by way of the cooling device is no longer necessary can charge at a better energy efficiency, and then the processing advances to Step S67. In Step S67, the second charge current value IFC2 calculated in Step S65 is set as the current command value, and then the processing advances to Step S57 of FIG. 6.

Figure 8:
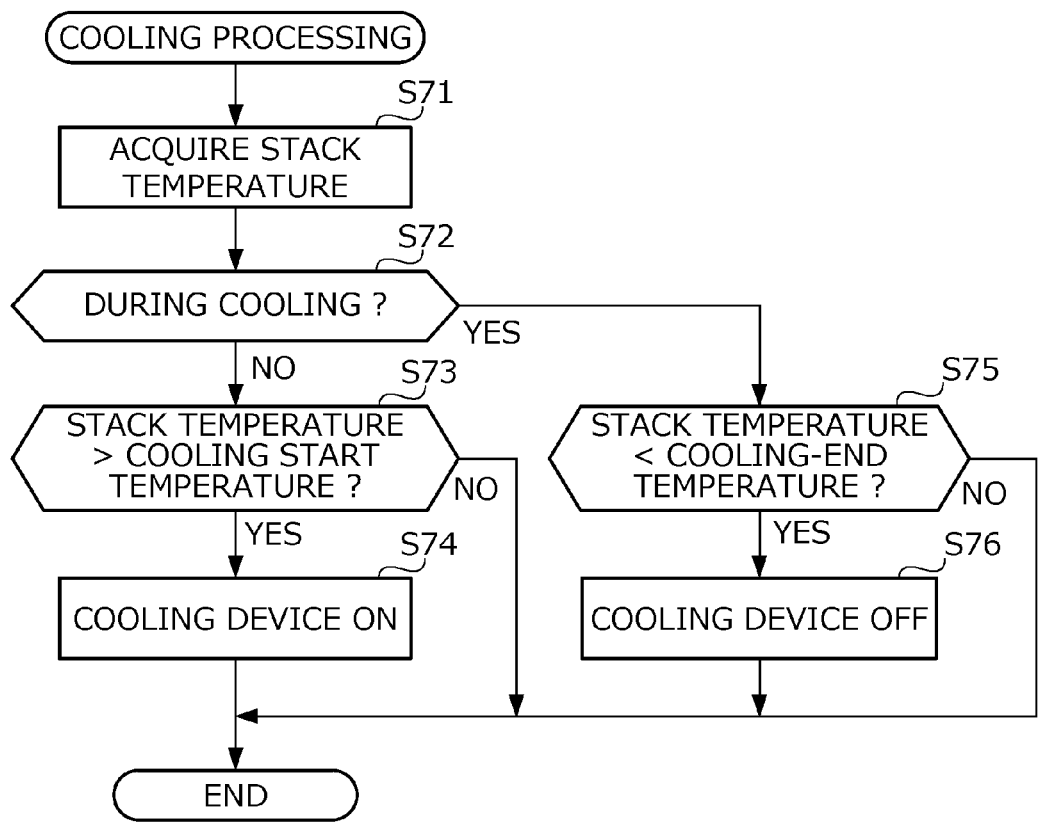
FIG. 8 is a flowchart showing a specific sequence of stack cooling processing.

FIG. 8 is a flowchart showing the specific sequence of cooling processing of the stack (Step S57 in FIG. 6). In the cooling processing of the stack, the cooling device is driven in accordance with the below sequence, so that the temperature of the stack during electric power generation does not exceed a predetermined maximum temperature set in order to protect the stack.

In Step S71, the current temperature of the stack is acquired, and then the processing advances to Step S72. In Step S72, it is determined whether it is during cooling of the stack, i.e. whether the cooling device is currently being driven.

In the case of the determination of Step S72 being NO and not being during cooling, the processing advances to Step S73. In Step S73, it is determined whether the current stack temperature is higher than a predetermined cooling start temperature. In the case of the determination of Step S73 being NO, the cooling device is left stopped, and the processing advances to Step S51 of FIG. 6. In the case of the determination of Step S73 being YES, the processing advances to Step S74, cooling is started by turning a coolant pump and radiator fan of the cooling device ON, and then the processing advances to Step S51 of FIG. 6. In addition, the flow of coolant and airflow of the radiator fan during cooling are controlled while considering the ambient air temperature and coolant temperature so that heat radiation counterbalancing the amount of heat generation of the stack is realized by the cooling device. It should be noted that the amount of heat generation of the stack during charge during stop processing can be estimated based on the current command value, remaining charge time, etc.

In the case of the determination of Step S72 being YES and being during cooling, the processing advances to Step S75. In Step S75, it is determined whether the current stack temperature is lower than a predetermined cooling-end temperature. In the case of the determination of Step S75 being NO, the cooling device is left ON, and the processing advances to Step S51 of FIG. 6. In the case of the determination of Step S75 being YES, cooling is ended by turning the coolant pump and radiator fan of the cooling device OFF, and then the processing advances to Step S51 of FIG. 6.

Although an embodiment of the present invention has been explained above, the present invention is not to be limited thereto, and the following such various modifications thereto are possible.

MODIFIED EXAMPLE 1

In the above-mentioned embodiment, the first charge current value IFC1 of the stack during charge processing is set so that charging of the remaining target charge amount completes before the remaining charge time elapses (refer to Step S61 of FIG. 7). However, for example, if the SOC of the battery during system stop is extremely small, such as in a case of stopping the vehicle ascending a hill in which the withdraw of electric power from the battery becomes great, the remaining target charge amount may increase excessively. If the remaining target charge amount increases excessively, the first charge current value IFC1 may be set to an excessively large value to try to complete charging within the remaining charge time. The present modified example assumes such a case, and sets a maximum value for the first charge current value IFC1 to limit the charge current of the stack to no more than this maximum value.

However, if the charge current of the stack is forcibly limited to no more than the maximum value, charging of the remaining target charge amount may not be able to be completed within the remaining charge time. In such a case, depending on the state of the stack and battery, it is preferable to cause both the charge during stop processing and sealed discharge processing to end within a defined stop processing permitted time, by causing one among charge during stop processing (Step S4 of FIG. 2) and sealed discharge processing (Step S5 of FIG. 2) to forcibly end in an incomplete state, and yet prioritizing the other one and allowing to complete. More specifically, for example, in the case of the remaining capacity corresponding to the minimum SOC (Step S11 of FIG. 3) already being ensured in the battery in the charge during stop processing, it is preferable to forcibly end the charge during stop processing even if charging is not completed (i.e. even if the remaining target charge amount is greater than 0), and prioritize the normal completion of sealed discharge processing. In addition, in the case of determining that the stack has degraded according to processing that is not illustrated, since it is estimated that the possibility of the withdrawn amount of electric power from the battery will increase during a subsequent startup is high, it is preferable to forcibly shorten the execution time of the sealed discharge processing, and prioritize normal completion of charge during stop processing.

MODIFIED EXAMPLE 2

In the above-mentioned embodiment, the charge current value in the case of trying to cause charging of the remaining target charge amount to complete in the remaining charge time was set as the minimum value for the current command value of the stack, as explained in Step S61 of FIG. 7. However, if the output of the stack becomes too small, the operating noise of the air compressor will also decrease, and it may become difficult for a user to grasp that charge processing is being performed. Since the charge processing is performed after a stop operation of the power switch by the user, it is particularly difficult for the user to grasp that the charge processing is being performed. To address this, in the present modified example, a minimum value is set to an appropriate magnitude for the current command value during charge processing so that the operating noise of the air compressor during charge processing does not become excessively small. According to the present modified example, it is possible to convey to the user the fact of being a state in which charge processing is being performed without providing a separate device.

MODIFIED EXAMPLE 3

In the above-mentioned embodiment, in the execution of the charge during stop processing of FIG. 6 is established so that the temperature of the stack does not exceed a predetermined maximum temperature by way of always monitoring the stack temperature and turning the cooling device ON in the case of the stack temperature exceeding a predetermined cooling-start temperature (refer to Steps S71 to S74 of FIG. 8); however, determination of whether or not cooling by way of the cooling device is necessary is not limited thereto. For example, it may be configured so as to estimate, at the moment when starting charge during stop processing, whether the temperature of the stack has reached the maximum temperature within the remaining target charge time in the case of continually charging at the charge current value IFC1 at which the net efficiency reaches a maximum, and turning the cooling device ON in the case of reaching the maximum temperature.

MODIFIED EXAMPLE 4

Although a case of performing sealed discharge processing (refer to Step S5 of FIG. 2) to cause the oxygen concentration inside the cathode flow channel to decrease has been explained in the above-mentioned embodiment as the concentration adjustment processing performed after the stop operation of the system, the present invention is not to be limited thereto. In addition to the aforementioned such sealed discharge processing, there is various processing in the concentration adjustment processing such as processing to decrease the hydrogen concentration inside the anode flow channel (anode hydrogen concentration reduction processing) and processing to dilute the residual hydrogen of the cathode flow channel (cathode-side hydrogen dilution processing). Therefore, after the stop operation of the system, the above-mentioned anode hydrogen concentration reduction processing or cathode-side hydrogen dilution processing may be performed in place of the sealed discharge processing. In addition, processing that combines the sealed discharge processing with the above-mentioned anode hydrogen concentration reduction processing or cathode-side hydrogen dilution processing may be performed as the concentration adjustment processing.

Second Embodiment

Hereinafter, a second embodiment of the present invention will be explained while referencing the drawings.

In the above-mentioned first embodiment, an example in which the stop method of a vehicle electrical power system of the present invention is applied to the electrical power system of a fuel cell vehicle (i.e. fuel cell system) has been explained; however, the present invention is not to be limited thereto. In the present embodiment, an example is explained in which the stop method of the vehicle electrical power system of the present invention is applied to a hybrid vehicle electrical power system that is equipped with an internal combustion engine, a battery, and a motor generator capable of generating electric power employing the driving power generated by the internal combustion engine and enabling travel with the electric power supplied from the battery. In this case, the internal combustion engine and motor generator correspond to the electric power generation means.

FIG. 9 is a flowchart showing the sequence of system stop processing of the present embodiment. This processing is started on the event of the ECU having received a signal commanding stop of the electrical power system, by a power switch (not illustrated) being operated, similarly to the stop processing of the fuel cell system explained in FIG. 2.

In Step S91, the current SOC (%) of the battery is calculated, and then the processing advances to Step S92.

In Step S92, the required SOC during stop is calculated, and then the processing advances to Step S93. This required SOC during stop corresponds to the remaining capacity that is minimally demanded in the battery upon stopping the system in order to ensure appropriate startup of the electrical power system subsequently. More specifically, in Step S93, the minimum SOC corresponding to the electric power minimally ensured upon stopping the system (refer to Step S11 of FIG. 3) and the assist correction amount are calculated, and the required SOC during stop is calculated by totaling these.

Hybrid vehicles can configure so as to supplement a deficiency in the output of the internal combustion engine and travel by way of supplying electric power from the battery to the motor generator. In this way, the withdrawn extent of electric power from the battery for supplementing the output shortage of the internal combustion engine upon causing the hybrid vehicle to travel changes, for example, depending on the magnitude of the acceleration demand of the driver, frequency of acceleration demands, etc., and can be estimated from the past travel history. Therefore, in Step S93, the withdrawn extent of electric power from the battery since subsequent startup of the system is estimated by referencing the past travel history, and the assist correction amount is calculated so as to be a larger value as the withdrawn extent increases. The required SOC during stop is thereby corrected to a larger value as the withdrawn extent of electric power from the battery increases.

In Step S93, it is determined whether the current SOC is smaller than the required SOC during stop. In the case of the current SOC being smaller than the required SOC during stop, it is determined that it is necessary to charge the battery in preparation for a subsequent startup, and then the processing advances to Step S94. On the other hand, in the case of the current SOC being at least the required SOC during stop, it is determined that the remaining capacity of the battery is sufficient, and then the system stop processing is immediately ended.

In Step S94, the difference between the required SOC during stop and current SOC is calculated as the target charge amount, and then the processing advances to Step S95. In Step S95, charge processing is executed to control the output of the electric power generation means based on the target charge amount, and charge the electric power generated by the electric power generation means to the battery.

What is claimed is:

1. A stop method of a vehicle electrical power system that includes:

a fuel cell that generates electric power when fuel gas is supplied to an anode flow channel and oxidant gas is supplied to a cathode flow channel;

an electrical storage device that stores electric power generated by the fuel cell;

a stop switch that generates a signal to cause electric power generation by way of the fuel cell to stop; and a load that is driven by way of supply of electric power from the fuel cell or the electrical storage device, wherein, after the stop switch has been operated, the system executes charge processing to charge electric power generated by the fuel cell to the electrical storage device, and concentration adjustment processing to adjust a concentration of gas inside at least one of the anode flow channel and the cathode flow channel, the method comprising the steps of:
calculating a charge time corresponding to a time in which charge processing is executable, after the stop switch has been operated, by subtracting a time required in the concentration adjustment processing from a predetermined stop processing permitted time;
calculating a target charge amount of the electrical storage device;
executing the charging processing while controlling output of the fuel cell based on the charge time and the target charge amount; and
executing the concentration adjustment processing after the charge processing has ended.

2. The stop method of a vehicle electrical power system according to claim 1, wherein a withdrawn extent of electric power from the electrical storage device upon a next startup of the vehicle electrical power system is estimated, and the target charge amount is set to a larger value as the withdrawn extent increases, in the step of calculating a target charge amount.

3. The stop method of a vehicle electrical power system according to claim 2, wherein it is determined whether a season in which the stop switch was operated is winter, and in a case of being winter, the target charge amount is set to a larger value than in a case of being a season other than winter, in the step of calculating a target charge amount.

4. The stop method of a vehicle electrical power system according to claim 3, wherein it is determined whether a current startup of the vehicle electrical power system is a low-temperature startup that is a startup under a low-temperature environment, and in a case of being a low-temperature startup, a vehicle startup time corresponding to a time period since the vehicle electrical power system was started until the stop switch was operated is acquired, and in a case of the vehicle startup time being shorter than a predetermined time, the target charge amount is set to a larger value than a case of the vehicle startup time being longer than the predetermined time, in the step of calculating a target charge amount.

5. The stop method of a vehicle electrical power system according to claim 4,
wherein a value obtained by dividing a value obtained by subtracting a consumed energy of the load from an output energy of the fuel cell, by an energy inputted to the fuel cell in order to generate electric power with the fuel cell, is defined as net efficiency,
wherein the load includes a compressor that supplies air as oxidant gas to the cathode flow channel, and
wherein, in the step of executing the charging processing while controlling output of the fuel cell, the output of the fuel cell is controlled so that charging of the target charge amount completes within the charge time and the net efficiency in the charge processing reaches an optimum.

6. The stop method of a vehicle electrical power system according to claim 5,
wherein the load includes a cooling device that cools the fuel cell, and
wherein, in the step of executing the charging processing while controlling output of the fuel cell,
a net efficiency in a case of performing charge processing by controlling the output of the fuel cell to a predetermined first output value while cooling the fuel cell by way of the cooling device is calculated as a first net efficiency,
a net efficiency in a case of performing charge processing by controlling the output of the fuel cell to a second output value that is smaller than the first output value so that cooling of the fuel cell by way of the cooling device is not necessary is calculated as a second net efficiency, and
the output of the fuel cell is controlled to the first output value in a case of the first net efficiency being larger than the second net efficiency, and the output of the fuel cell is controlled to the second output value in a case of the first net efficiency being no more than the second net efficiency.

7. The stop method of a vehicle electrical power system according to claim 6, wherein the concentration adjustment processing includes concentration reduction processing to cause an oxygen concentration inside of the cathode flow channel to decrease.

8. The stop method of a vehicle electrical power system according to claim 1, wherein it is determined whether a season in which the stop switch was operated is winter, and in a case of being winter, the target charge amount is set to a larger value than in a case of being a season other than winter, in the step of calculating a target charge amount.

9. The stop method of a vehicle electrical power system according to claim 1, wherein it is determined whether a current startup of the vehicle electrical power system is a low-temperature startup that is a startup under a low-temperature environment, and in a case of being a low-temperature startup, a vehicle startup time corresponding to a time period since the vehicle electrical power system was started until the stop switch was operated is acquired, and in a case of the vehicle startup time being shorter than a predetermined time, the target charge amount is set to a larger value than a case of the vehicle startup time being longer than the predetermined time, in the step of calculating a target charge amount.

10. The stop method of a vehicle electrical power system according to claim 1,
wherein a value obtained by dividing a value obtained by subtracting a consumed energy of the load from an output energy of the fuel cell, by an energy inputted to the fuel cell in order to generate electric power with the fuel cell, is defined as net efficiency,
wherein the load includes a compressor that supplies air as oxidant gas to the cathode flow channel, and
wherein, in the step of executing the charging processing while controlling output of the fuel cell, the output of the fuel cell is controlled so that charging of the target charge amount completes within the charge time and the net efficiency in the charge processing reaches an optimum.

11. The stop method of a vehicle electrical power system according to claim 10,
wherein the load includes a cooling device that cools the fuel cell, and
wherein, in the step of executing the charging processing while controlling output of the fuel cell,
a net efficiency in a case of performing charge processing by controlling the output of the fuel cell to a predetermined first output value while cooling the fuel cell by way of the cooling device is calculated as a first net efficiency,
a net efficiency in a case of performing charge processing by controlling the output of the fuel cell to a second output value that is smaller than the first output value so that cooling of the fuel cell by way of the cooling device is not necessary is calculated as a second net efficiency, and the output of the fuel cell is controlled to the first output value in a case of the first net efficiency being larger than the second net efficiency, and the output of the fuel cell is controlled to the second output value in a case of the first net efficiency being no more than the second net efficiency.

12. The stop method of a vehicle electrical power system according to claim 1, wherein the concentration adjustment processing includes concentration reduction processing to cause an oxygen concentration inside of the cathode flow channel to decrease.

13. The stop method of a vehicle electrical power system according to claim 12, wherein it is determined whether a season in which the stop switch was operated is winter, and in a case of being winter, the target charge amount is set to a larger value than in a case of being a season other than winter, in the step of calculating a target charge amount.

14. The stop method of a vehicle electrical power system according to claim 12, wherein it is determined whether a current startup of the vehicle electrical power system is a low-temperature startup that is a startup under a low-temperature environment, and in a case of being a low-temperature startup, a vehicle startup time corresponding to a time period since the vehicle electrical power system was started until the stop switch was operated is acquired, and in a case of the vehicle startup time being shorter than a predetermined time, the target charge amount is set to a larger value than a case of the vehicle startup time being longer than the predetermined time, in the step of calculating a target charge amount.

15. The stop method of a vehicle electrical power system according to claim 12, wherein a value obtained by dividing a value obtained by subtracting a consumed energy of the load from an output energy of the fuel cell, by an energy inputted to the fuel cell in order to generate electric power with the fuel cell, is defined as net efficiency, wherein the load includes a compressor that supplies air as oxidant gas to the cathode flow channel, and wherein, in the step of executing the charging processing while controlling output of the fuel cell, the output of the fuel cell is controlled so that charging of the target charge amount completes within the charge time and the net efficiency in the charge processing reaches an optimum.

16. The stop method of a vehicle electrical power system according to claim 15, wherein the load includes a cooling device that cools the fuel cell, and wherein, in the step of executing the charging processing while controlling output of the fuel cell, a net efficiency in a case of performing charge processing by controlling the output of the fuel cell to a predetermined first output value while cooling the fuel cell by way of the cooling device is calculated as a first net efficiency, a net efficiency in a case of performing charge processing by controlling the output of the fuel cell to a second output value that is smaller than the first output value so that cooling of the fuel cell by way of the cooling device is not necessary is calculated as a second net efficiency, and the output of the fuel cell is controlled to the first output value in a case of the first net efficiency being larger than the second net efficiency, and the output of the fuel cell is controlled to the second output value in a case of the first net efficiency being no more than the second net efficiency.

* * * * *